(12) United States Patent
Ropp

(10) Patent No.: US 6,988,703 B2
(45) Date of Patent: Jan. 24, 2006

(54) SEAT SUSPENSION SHOCK ABSORBER

(75) Inventor: Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 10/289,973

(22) Filed: Nov. 7, 2002

(65) Prior Publication Data

US 2003/0106981 A1 Jun. 12, 2003

Related U.S. Application Data

(63) Continuation of application No. 09/884,891, filed on Jun. 19, 2001.

(51) Int. Cl.
F16M 13/00 (2006.01)

(52) U.S. Cl. .................................. 248/618; 248/635
(58) Field of Classification Search ................ 248/560, 248/566, 568, 629, 618, 621, 634, 635, 638, 248/421, 157; 267/161
See application file for complete search history.

(56) References Cited

U.S. PATENT DOCUMENTS

| 1,732,647 A | 10/1929 | Flintermann ................ 248/609 |
| 1,951,013 A | 3/1934 | Flinterman |
| 2,841,388 A | 7/1958 | Hehn ........................ 297/152 |
| 3,672,721 A | 6/1972 | Williams .................. 297/303.1 |
| 4,128,217 A | 12/1978 | Mazelsky ............... 244/122 R |
| 4,215,841 A * | 8/1980 | Herring, Jr. ................. 248/635 |
| 4,477,050 A | 10/1984 | Thompson et al. |
| 4,852,943 A | 8/1989 | Roper ..................... 297/303.1 |
| 4,856,763 A | 8/1989 | Brodersen et al. .......... 267/131 |
| 5,123,625 A | 6/1992 | Spaltofski |
| 5,125,631 A | 6/1992 | Brodersen et al. .......... 267/131 |
| 5,553,834 A | 9/1996 | Je et al. ................. 267/140.12 |
| 5,697,478 A | 12/1997 | Di Stefano ................ 188/371 |
| 5,967,500 A | 10/1999 | Satori et al. ................ 206/509 |
| 6,003,944 A | 12/1999 | Glockl ....................... 297/337 |
| 6,019,422 A | 2/2000 | Taormino et al. ......... 297/195.1 |
| 6,042,093 A | 3/2000 | Garelick ..................... 267/131 |
| 6,056,519 A * | 5/2000 | Morita et al. ............... 417/415 |
| 6,068,248 A | 5/2000 | Lim ...................... 297/140.12 |
| 6,106,064 A | 8/2000 | Hibberd ..................... 297/314 |
| 6,382,606 B1 * | 5/2002 | Horng ........................ 267/161 |

FOREIGN PATENT DOCUMENTS

| EP | 0964178 | 5/1999 |
| FR | 2119169 | 12/1970 |
| GB | 494811 | 5/1937 |
| GB | 1373584 | 2/1972 |

* cited by examiner

*Primary Examiner*—Ramon O Ramirez
(74) *Attorney, Agent, or Firm*—Niro, Scavone, Haller & Niro

(57) ABSTRACT

A seat suspension includes a first section and a second section which are moveably connected. A deformable isolator is located between the sections. The isolator is held in place by a retaining means such a ring, post and in other ways. The isolator is comprised of a plurality of gaps separating solid sections which cooperate to resist the movement of at least one of the sections. This may be accomplished by resisting the movement of the section as it is urged against the isolator.

10 Claims, 4 Drawing Sheets

SEAT SUSPENSION SHOCK ABSORBER

This application is a continuation of Ser. No. 09/884,891, filed Jun. 19, 2001.

BACKGROUND OF THE INVENTION

The present invention relates to seat suspensions. More specifically, the present invention relates to a seat suspension which uses an isolator to dampen movement in the suspension.

SUMMARY OF THE INVENTION

In the construction of seat suspensions, for the comfort of the user, it is desirable to provide shock absorbers or dampeners which diminish or dampen forces transmitted to the seat. Such forces often include, but are not limited to, fore and aft movement and/or vertical movement.

Typically, such dampeners are comprised of springs and various types of shock absorbers which may be gas charged or hydraulic. Typical examples of some of the different types of seat suspensions in which the present invention may be used are shown and described in U.S. Pat. Nos. 4,856,763 and 5,125,631, which are incorporated herein by reference.

However, the use of such devices in a seat suspension increases the manufacturing cost of the suspension. Thus, there is a need to provide a dampening system which is comprised of inexpensive components. The present invention provides such a system through the use of components which are economical to obtain and/or manufacture.

The present invention provides an isolator that functions as the dampener in the suspension. Movement in the suspension is transmitted to the isolator which causes the shape of the isolator to deform. As the isolator deforms, a resistance force is generated that acts against the force being applied.

In another embodiment, the isolator includes a plurality of gaps. Resistance is created by compressing the gaps or colliding solid sections created by the gaps against other solid sections. In addition, the gaps may be larger near the center of the isolator. Configuring the isolator in this manner results in an ability to generate a resistance force that may exponentially increases in order to create a system that is capable of handling light forces as well as larger forces.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Figure 1:
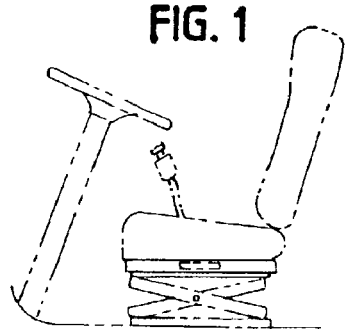
FIG. 1 shows a typical seat suspension using one embodiment of the present invention.
Figure 2:
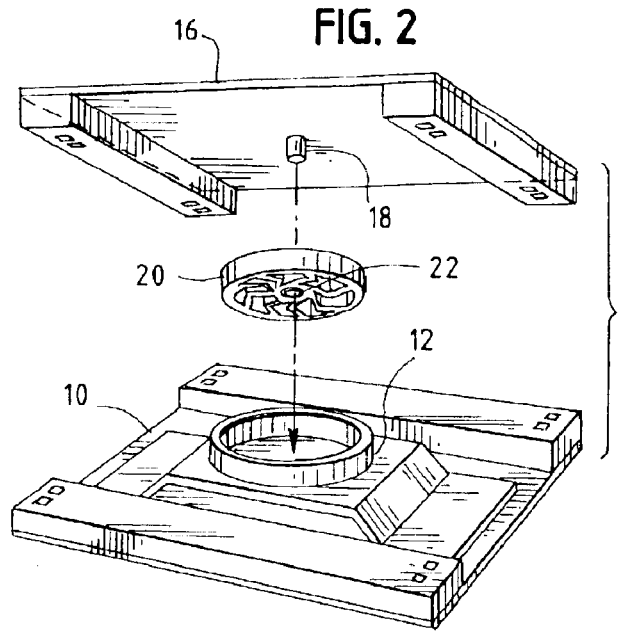
FIG. 2 is an exploded perspective view of one embodiment of the present invention with portions removed to reveal aspects of the present invention.
Figure 3:
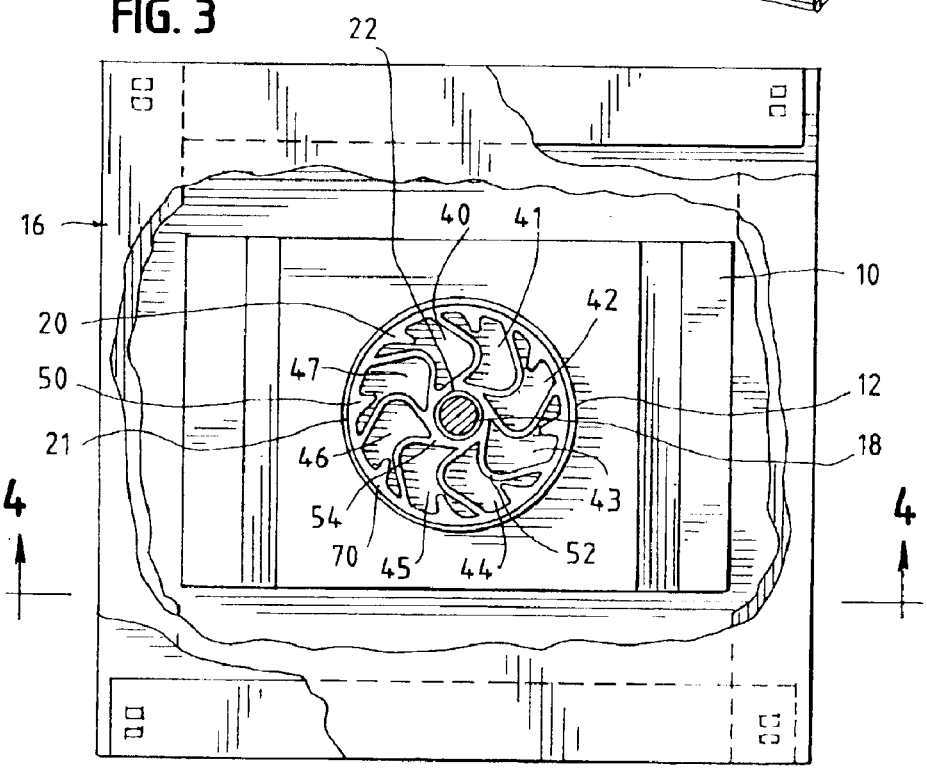
FIG. 3 is a top view with portions removed to reveal aspects of one embodiment of the present invention.
Figure 4:
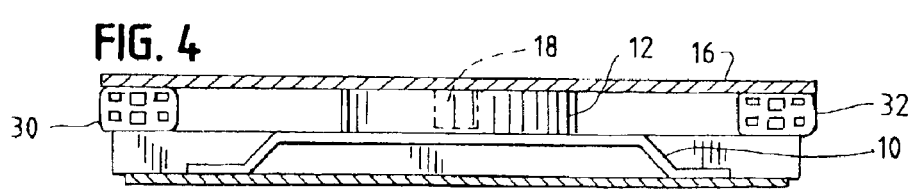
FIG. 4 is a partial cross-sectional view of the embodiment shown in FIG. 3 taken along line 4—4.
Figure 5:
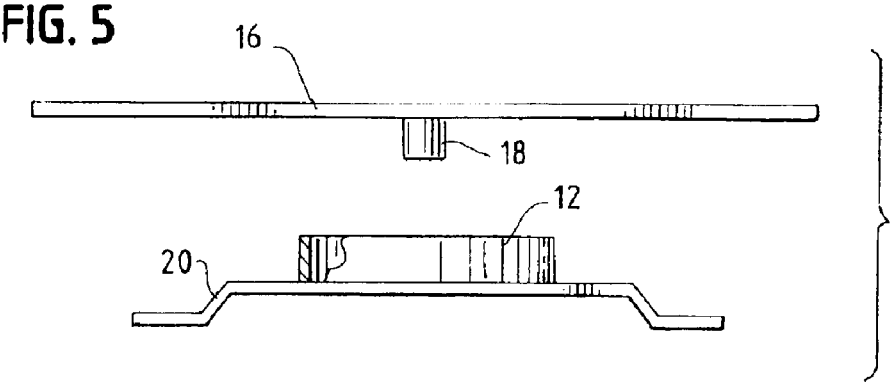
FIG. 5 is a fragmentary cross-sectional view of an embodiment of the present invention.

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

As shown in FIGS. 1–5, one embodiment of the present invention includes a first section or plate 10 which includes an enclosure or housing 12. Housing 12 retains isolator 20 which may be deformable. In the example described, housing 12 and isolator 20 are shown as being circular in shape but other shapes may be used as well.

Located opposite plate 10 is a second plate or section 16. Depending from a portion of plate 16 is an actuator or pin 18. Actuator 18 is sized to fit within an aperture 22 located in isolator 20. While actuator 18 is shown as cylindrical in shape, it may be of any shape and size that permits engagement with isolator 20 or allows the isolator to be in communication with both sections. As would be known to those of skill in the art, sections or plates 10 and 16 may be configured to operate in conjunction with additional assemblies found in typical seat suspensions including, but not limited to, seats, frames, scissor assemblies, guide assemblies and the like.

In a preferred embodiment, opposingly located guides 30 and 32 slidingly connect plate 10 to plate 16. This permits plate 16 to move relative to plate 10, which may be stationary. Of course, other arrangements may also be used to permit section 10 to move relative to section 16.

As shown in FIGS. 3, 6, 8 and 9, isolator 20 may be comprised of a plurality of raised lobes 40–47 which are solid sections formed by a plurality of spaces or gaps 50, 52 and 54, among others. The gaps create at least one pathway 70 between the solid sections or masses. As shown, isolator 20 may be comprised of a number of different shapes. In addition, isolator 20 may even be a solid.

As shown in FIGS. 3, 6, 8 and 9, the spacing or gaps between the lobes or solid sections may be varied and in some instances greater in distance near the center. The lobes may also be all of the same configuration or different shapes as shown. In addition, the gaps may extend completely or partially through the isolator.

In use, isolator 20 may be used as a shock absorber to dampen forces which may act upon the seat suspension. The invention may be used to dampen forces in any direction desired including, but not limited to, fore and aft, vertical, and/or sideways or in other directions. However, for ease of explanation, a description of how the present invention may be used to dampen fore and aft forces is provided.

As a force is applied to the device, actuator or pin 18 is pressed against isolator 20 which may be made of a deformable material such as rubber which is one inch in thickness and four inches in outer diameter. Of course, other materials which deform when acted upon may be used as well.

When actuator 18 presses against isolator 20, the material is compressed or deformed and compresses the gaps and then may cause the solid portions to collide with one another. This creates a resistance force which works to push actuator 18 back towards its original position. Once the force acting upon actuator 18 is fully dampened, the elasticity of the isolator will return the seat suspension to its original operating position.

The amount of resistance created by isolator 20 depends upon the mass and shape of the isolator, the size of the solid portions, as well as the size of the gaps. It has been found that the closer each of the solid portions are located to one another, the greater the resistance force generated.

Figure 10:
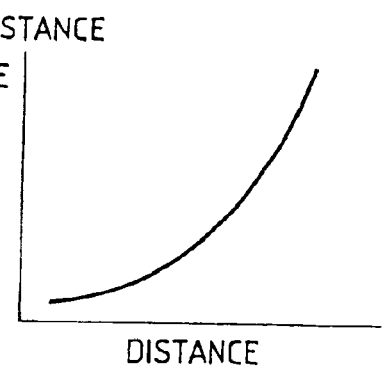
FIG. 10 is a graphical representation of the exponential resistance created by an isolator of the present invention.

In another embodiment of the present invention, the size of the gaps varies to create different resistance curves. For example, as shown in FIG. 10, an exponential resistance is created by having the spacing be greater in the area near the center of the isolator. In this configuration, the initial movement of actuator 18 is met with a smaller amount of resistance which assists in smoothly dampening light loads placed on the suspension. However, as greater loads are applied to the system, actuator 18 will continue to deform isolator 20 causing the more closely spaced sections to collide or impact one another. This increases the resistance created. Isolator 20 will then absorb the force and return the suspension to its operating position. This embodiment of the present invention is capable of dampening all types of loads or forces encountered, with the resistance correspondingly increasing with the load applied.

Figure 6:
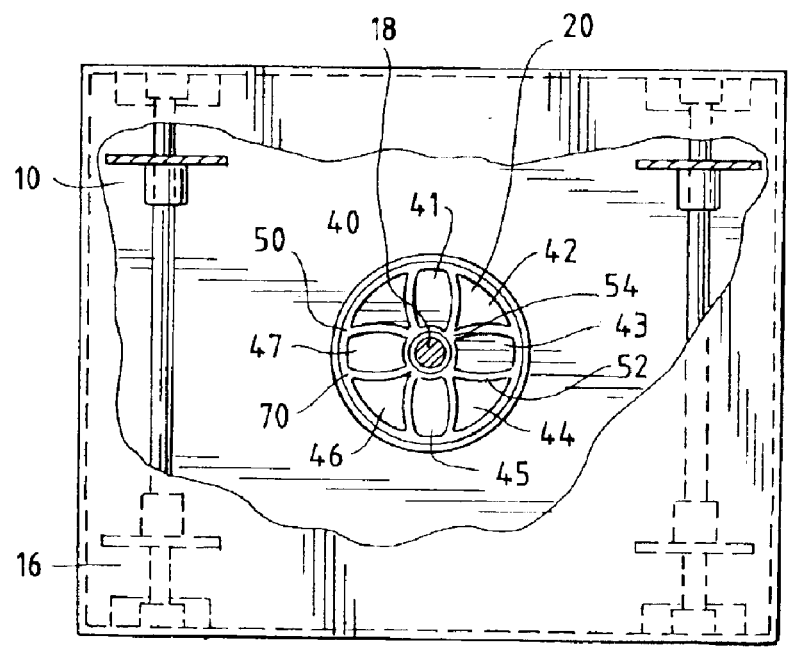
FIG. 6 is a top view with portions removed to reveal aspects of an alternate embodiment of an isolator which may be used with the present invention.
Figure 7:
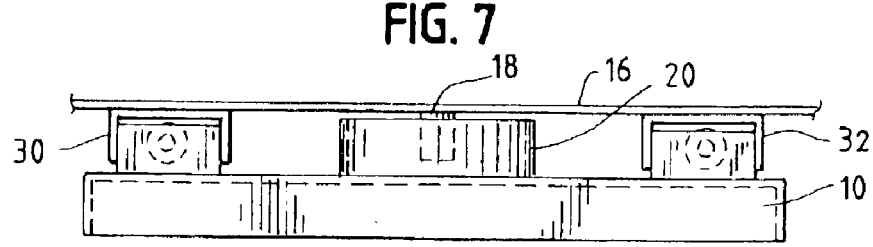
FIG. 7 shows another cross-sectional view illustrating an embodiment of the present invention.
Figure 8:
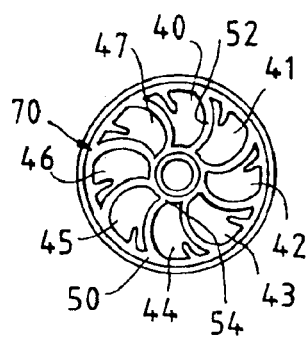
FIGS. 8 and 9 are top views of alternate embodiments of an isolator which may be used with the present invention.
Figure 9:
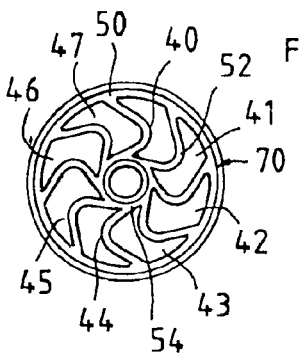

As shown in FIGS. 6–7, in another embodiment, plate 16 and actuator 18 remain stationary while plate 10 is the moveable component. Again, guides 30 and 32 assist in allowing for ease of movement. In this embodiment, the operation of the device is reversed with isolator 20 being urged by housing 12 against actuator 18 by the forces that are applied to the suspension.

Figure 11:
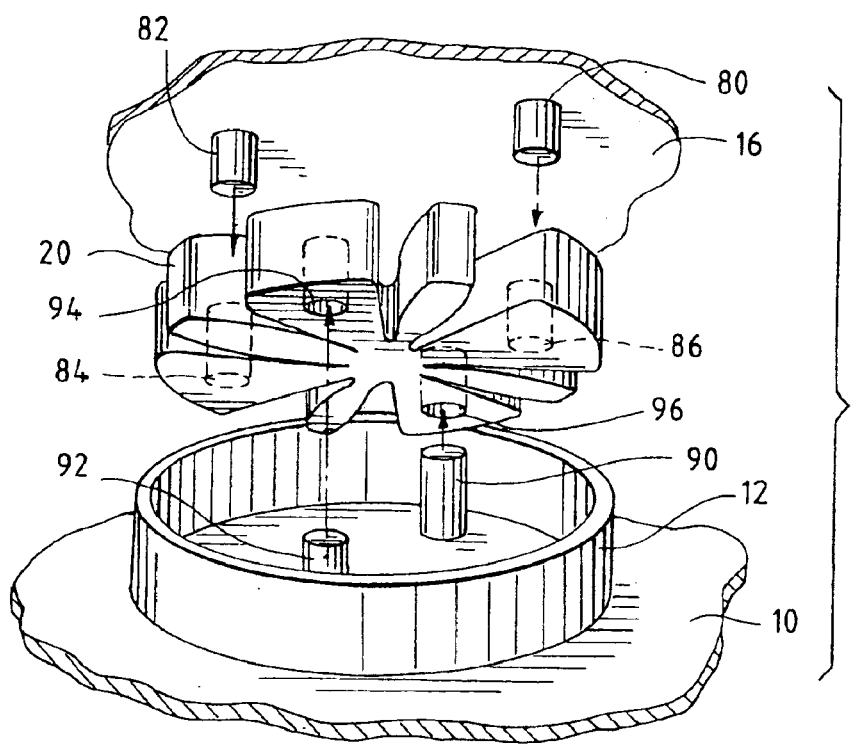
FIG. 11 is a partial perspective view illustrating another embodiment of the present invention.
Figure 12:
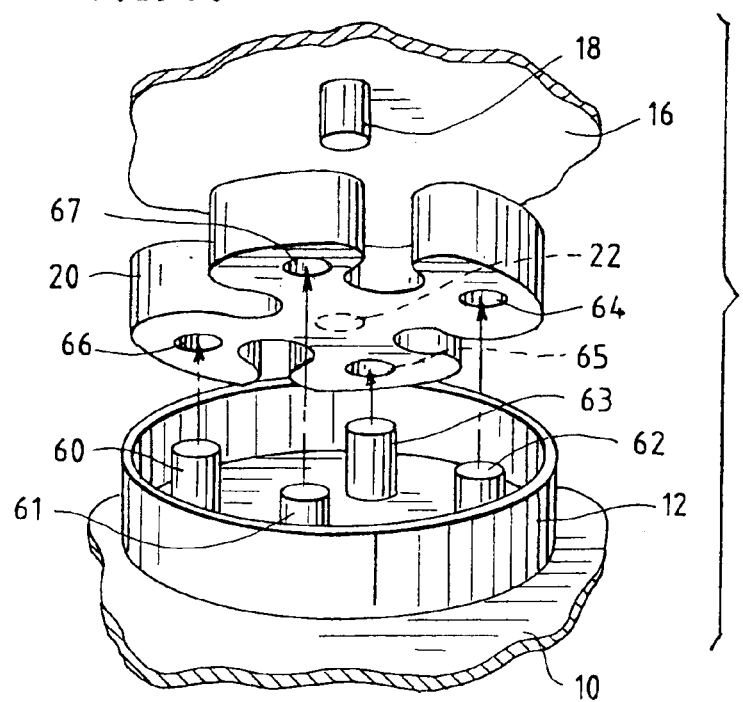
FIG. 12 is a partial perspective view illustrating another embodiment of the present invention.

As shown in FIGS. 11 and 12, isolator 20 need not be engaged in an aperture located in the center of the isolator. The aperture may be located in other areas as well. For example, FIG. 11 shows section 16 having pins or actuators 80 and 82 which are received by apertures 84 and 86 in isolator 20. Section 10 may also include pins 90 and 92 which are received by apertures 94 and 96. FIG. 12 shows that plate 10 may include pins 60–63 which are received by apertures 64–67. In both of these configurations, enclosure 12 is not needed and may be eliminated since the pins extending from sections 10 and 16 will sufficiently retain isolator 20. Moreover, isolator 20 may be engaged along other points as well including a side or sides, top, bottom and other locations.

Figure 13:
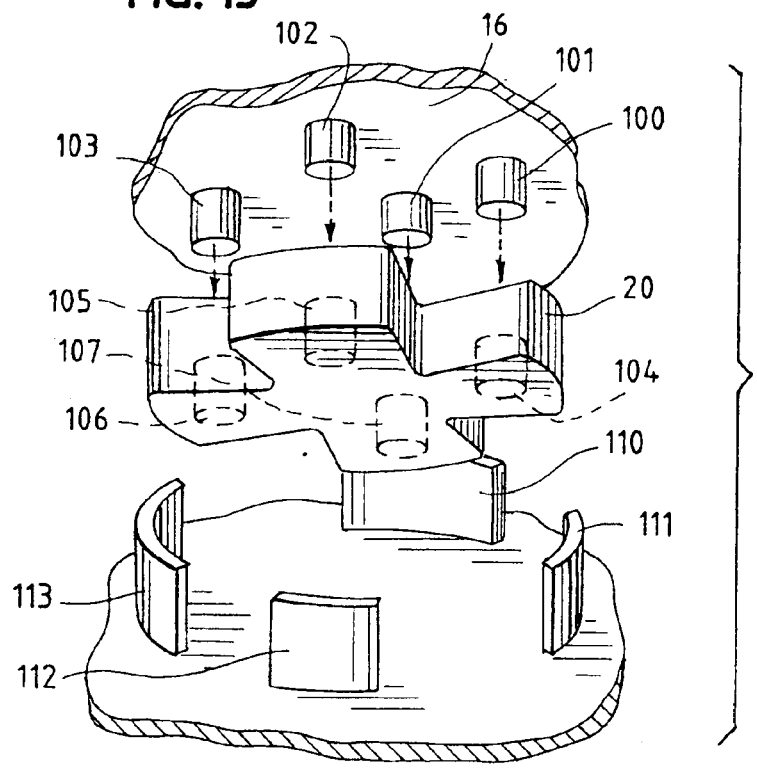
FIG. 13 is a partial perspective view illustrating another embodiment of the present invention.

FIG. 13 shows an embodiment in which enclosure or housing 12 does not extend fully around isolator 20. Instead pins 100–103 on plate 10 are received by apertures 104–106. Isolator 20 is retained by plate 10 through an enclosure that consists of a plurality of segments 110–113 which engage the outer edge of isolator 20 at various points along the isolator.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A seat suspension comprising:

a first section and an opposingly located second section, said first section being moveable relative to said second section;

a deformable isolator in communication with said first and second sections;

an actuator depending from said first section and in communication with said isolator;

said isolator being adapted to resist movement of said first section and return said first section to an operating position; and said isolator also being engaged by an enclosure located on said second section.

2. A seat suspension comprising:

a first section and an opposingly located second section, said first section being moveable relative to said second section;

a deformable isolator in communication with said first and second sections;

an actuator depending from said first section and in communication with said isolator;

said isolator being adapted to resist movement of said first section and return said first section to an operating position; and said isolator also being adapted to create a resistance force which exponentially increases with movement of said first section.

3. A seat suspension comprising:

First and second sections moveably connected;

a deformable isolator located between said sections and held in place by a plurality of pins which extend into said isolator;

and said isolator comprising a plurality of gaps separating solid sections which cooperate to resist movement of at least one of said first and second sections when one of said first or second sections is urged against said isolator.

4. A seat suspension comprising:

First and second sections moveably connected;

a deformable isolator located between said sections and engaged by an enclosure and at least one pin; and said isolator comprising a plurality of gaps separating solid sections which cooperate to resist movement of at least one of said first and second sections when one of said first or second sections is urged against said isolator.

5. The device of claim 4 wherein said enclosure surrounds an outer edge of said isolator.

6. The device of claim 4 wherein said enclosure is comprised of a plurality of segments.

7. The device of claim 4 wherein said gaps are larger in size near the center of said isolator.

8. The device of claim 4 wherein said isolator creates a resistance force which exponentially increases with increasing movement of said sections.

9. The device of claim 4 wherein said suspension resists fore and aft movement.

10. The device of claim 4 where said suspension resists vertical movement.

* * * * *